United States Patent

[11] 3,594,736

[72] Inventor Charles R. Hoffman
Tempe, Ariz.

[21] Appl. No. 779,727
[22] Filed Nov. 29, 1968
[45] Patented July 20, 1971
[73] Assignee Motorola, Inc.
Franklin Park, Ill.

[54] MOS READ-WRITE SYSTEM
10 Claims, 4 Drawing Figs.

[52] U.S. Cl. .......... 340/173FF, 307/238, 307/279, 307/291
[51] Int. Cl. .......... G11c 11/40, H03k 3/286
[50] Field of Search .......... 340/173, 172.5; 307/238, 279

[56] References Cited

UNITED STATES PATENTS 3,292,008 12/1966 Rapp .......... 340/173
3,447,137 5/1969 Fever .......... 340/173

*Primary Examiner*—Terrell W. Fears
*Attorney*—Mueller and Aichele

ABSTRACT: Disclosed is a MOS read-write system for reading the binary content of a MOS storage cell and for writing into the storage cell. The system includes cross-coupled MOS devices which are connected to bit lines leading into the MOS storage cell, and these MOS devices or drivers are connected in push-pull and are conductively controlled by data and read and write command signals. The MOS devices are connected to write inverters for receiving a write command signal and to data inverters for receiving data input signals. A MOS read gate is connected between the MOS devices and a read command input terminal and is further connected to an input-output data line. The bit lines are isolated from the input-output data line by the read gate, by the MOS switching devices and by a pair of bit line terminating devices. The storage cell is connected across the pair of bit lines and is interrogated and written into by applying data signals and read and write command signals to the system.

INVENTOR.
Charles R. Hoffman
BY
Mueller, Aichele & Rauner
ATTY'S.

INVENTOR.
Charles R. Hoffman

BY Mueller, Aichele & Rauner

ATTY'S.

MOS READ-WRITE SYSTEM

BACKGROUND OF THE INVENTION

This invention relates generally to semiconductor memory systems and more particularly to an improved metal-oxide-semeconductor (MOS) memory system which may be fabricated in monolithic integrated form.

Frior art MOS memories frequently include at least one basic MOS storage cell comprising two or more MOS devices cross-coupled in a bistable flip-flop arrangement. Additional MOS load devices are commonly connected, respectively, to the cross-coupled MOS devices. The two MOS cross-coupled devices alternatively conduct as the storage cell is switched from one to the other of its two binary states, and it is standard practice to connect the two cross-coupled MOS devices respectively through additional "series" MOS devices to a pair of bit lines.

One of the disadvantages associated with the above described prior art MOS memory systems is that these bit lines are connected directly to circuitry external to the semiconductor structure within which the system is fabricated (frequently referred to as the "outside world"). Thus, the prior art MOS memory systems have bit lines connected directly to the large external load capacitances and noise associated with the "outside world." This direct connection of the bit lines to external loads frequently causes extraneous switching of the MOS memory cells, and the MOS memory cells are often required to charge up large load capacitances during interrogation or reading of the cell.

SUMMARY OF THE INVENTION

An object of the present invention is to provide a new and improved MOS memory system which may be fabricated in monolithic integrated circuit form.

Another object of this invention is to provide a new and improved MOS memory system having a MOS storage cell which is isolated from noise present in circuitry external to the system.

A further object of this invention is to provide a new and improved MOS memory system having a MOS memory cell which is isolated from the effects of external load capacitance associated with circuitry external to the system.

THe present invention features a read-write MOS memory system having complementary MOS push-pull drivers cross-coupled between a pair of bit lines feeding the basic MOS memory cell of the system. Read and write data is coupled into the MOS push-pull drivers, and these MOS drivers control the binary conductive state of the basic MOS cell and serve to isolate the bit lines from the "outside world" or the input-output data line for the system.

Another feature of the present invention is the provision of a MOS read gate and a MOS output buffer device serially connected between one of the bit lines and the input-output data line. These latter MOS devices serve to isolate one of the bit lines from circuitry external to the memory system.

Another feature of this invention is the provision of bit line terminating devices connected to the bit lines, and these devices may be resistors or MOS load devices. THese terminating devices provide desired terminating impedances for the bit lines.

Another feature of this invention is the provision of a MOS write switching gate which is connected to a write input terminal for receiving thereat a write command signal. The MOS write switching gate has first and second output terminals which are connected, respectively, to first and second input connections of the MOS push-pull devices. The MOS write switching gate establishes a predetermined binary input signal condition at the MOS devices in response to a write command signal applied to the MOS write switching gate.

Another feature of this invention is the provision of MOS data input switching circuitry including a MOS inverter and a MOS reinverter, the outputs of which are connected to the complementary MOS push-pull drivers. When a write command signal is applied to the MOS write switching gate, the MOS push-pull drivers are enabled for conduction, and at this time data input signals applied to the MOS input switching circuitry are operative to control the conductive state of the push-pull MOS drivers. The push-pull drivers in turn couple this data into the MOS storage cell.

Another feature of this invention is the provision of a plurality of MOS NOR gates connected to a word line for the MOS storage cell. THese NOR gates control the potential on the word line which in turn enables the writing into or interrogation of the MOS storage cell.

Another feature of this invention is the provision of parallel connected MOS devices in the read gate. One of the latter MOS devices is connected to a read command signal and the other of the MOS devices is connected to one of the bit lines. The read gate is connected through a MOS output buffer device to the data line, and a predetermined potential must exist on the one bit line before a read command signal applied to the other of the parallel connected MOS devices will drive the buffer MOS device into conduction. When the buffer MOS device conducts, the data in-data out line is driven to the "on" voltage $V_{ON}$ of the output MOS buffer device to indicate the presence of a binary "ONE" stored in the MOS storage cell.

THese and other objects and features of the present invention will become more fully apparent from the following description of the accompanying drawing.

BRIEF DESCRIPTION OF THE INVENTION

Briefly described, the present invention is directed to a MOS memory system which includes complementary "totem pole" or push-pull MOS drivers which are connected between a pair of bit lines and the data in-data out line of the system. The bit lines are connected to a standard MOS storage cell which functions as a bistable flip-flop. THe push-pull MOS drivers are also connected through MOS read and write gates to receive write command signals and the push-pull MOS drivers respond to command signals to control the conductive state of the MOS storage cell. Writing into the MOS storage cell is accomplished by applying input data via MOS inverters to the push-pull MOS drviers during the application of a write command signal to the MOS write gate. THe MOS read gate is connected between one of the bit lines and the data in-data out line. A binary indication of the conductive state of the MOS storage appears on the data in-data out line when the MOS storage cell is interrogated by the application of a read command signal to the read gate. Both the MOS read gate and the MOS push-pull drivers isolate the bit lines and the MOS storage cell from the data in-data output lines. Therefore, external noise and large load capacitances which appear on the data in-data output line are not connected directly to the bit lines but instead are connected through the high impedance MOS devices to the bit lines.

IDENTIFICATION OF CIRCUIT AND SYSTEM COMPONENTS

In this section of the specification, the block and schematic diagrams in FIGS. 1, 3 and 4 will be described with emphasis on merely identifying circuit components and how these circuit components are connected to receive and decode the binary data. In a subsequent portion of the specification, the read and write circuit operation will be described.

Figures 1, 2:
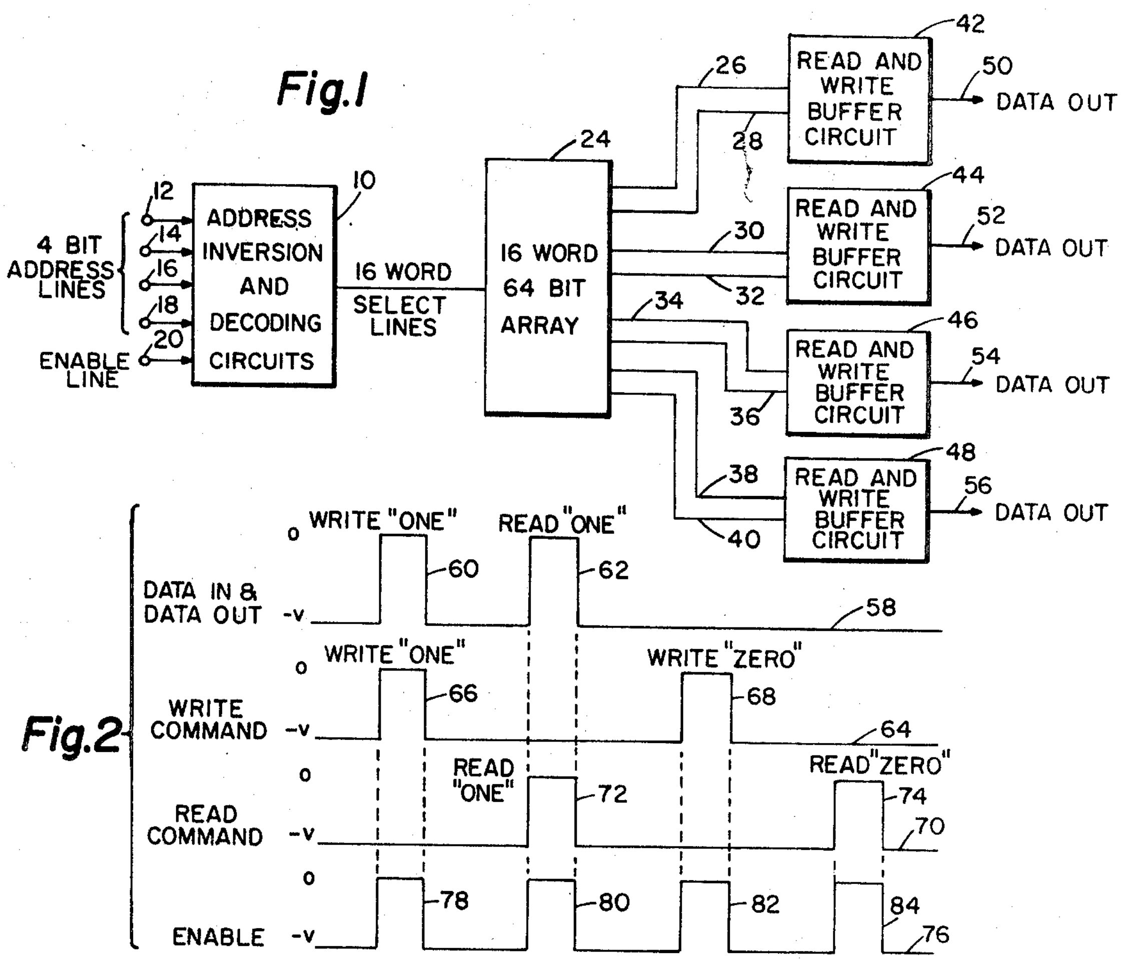
FIG. 1 is a block diagram of a memory system whicn includes the read and write buffer circuit of the present invention.
FIG. 2 is a waveform diagram of the binary input data to which the system of FIG. 1 responds and binary output data thereof.

Referring to FIG. 1, there is shown address, inversion and decoding circuitry 10 having four-bit address lines 12, 14, 16 and 18 and an enable line 20 connected thereto. In a system of the type shown in FIG. 1 which has been built and successfully operated, the address, inversion and decoding circuits 10 have sixteen metal-oxide-semiconductor (MOS) address-decode NOR gates, each of which are connected to drive four bits in a 16 word, 64-bit MOS memory array 24. For convenience, the 16 output word select lines from these 16 NOR gates are represented by a single connection 22 in FIG. 1.

THe 16 word, 64-bit array 24 has four-bit line output pairs 26—28, 30—32, 34—36 and 38—40, respectively, connected to the inputs of four identical read and write buffer circuits 42, 44, 46 and 48, respectively. The read and write data appears on the single rail output lines 50, 52, 54 and 56, as will be explained hereinafter in more detail.

The data, write-command, read-command, and enable signals illustrated in the waveform diagrams in FIG. 2 will be discussed further with reference to the read and write circuitry in FIGS. 3 and 4 and the operation thereof in response to the above signals. Positive logic will be used and a negative voltage −V will denote a binary "ZERO" and zero or ground potential will denote a binary "ONE."

Figure 3:
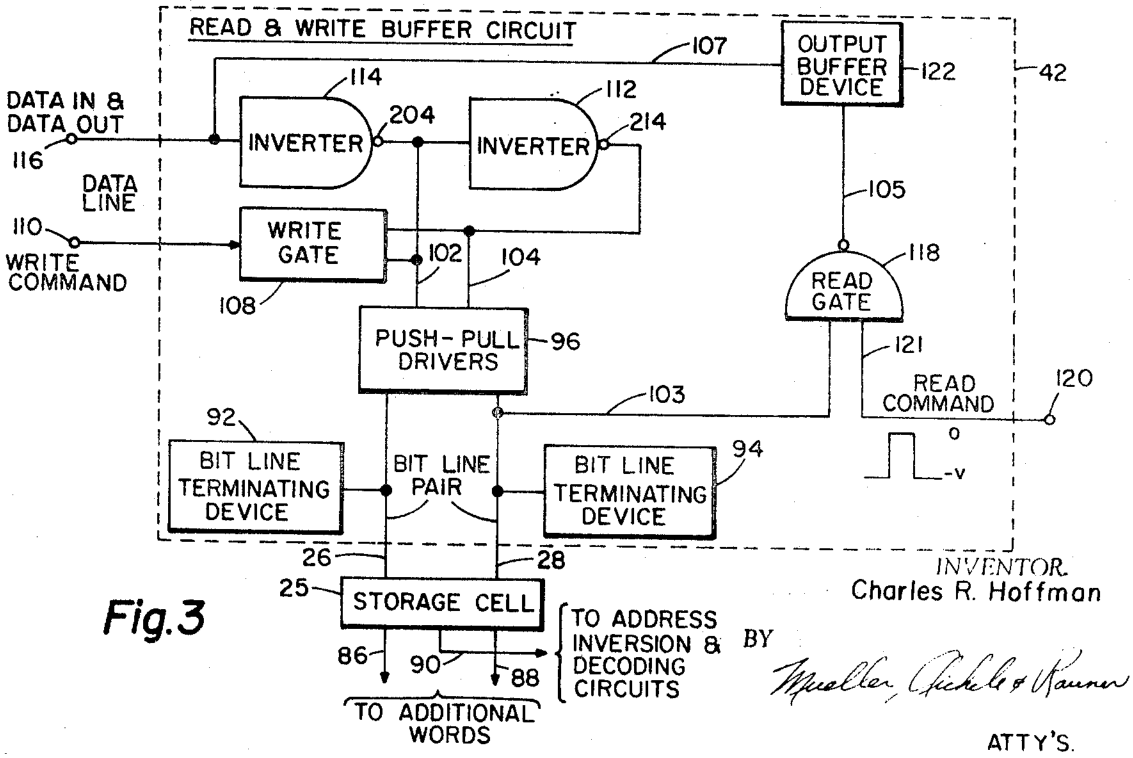
FIG. 3 is a block diagram of the read and write buffer circuitry according to the present invention.
Figure 4:
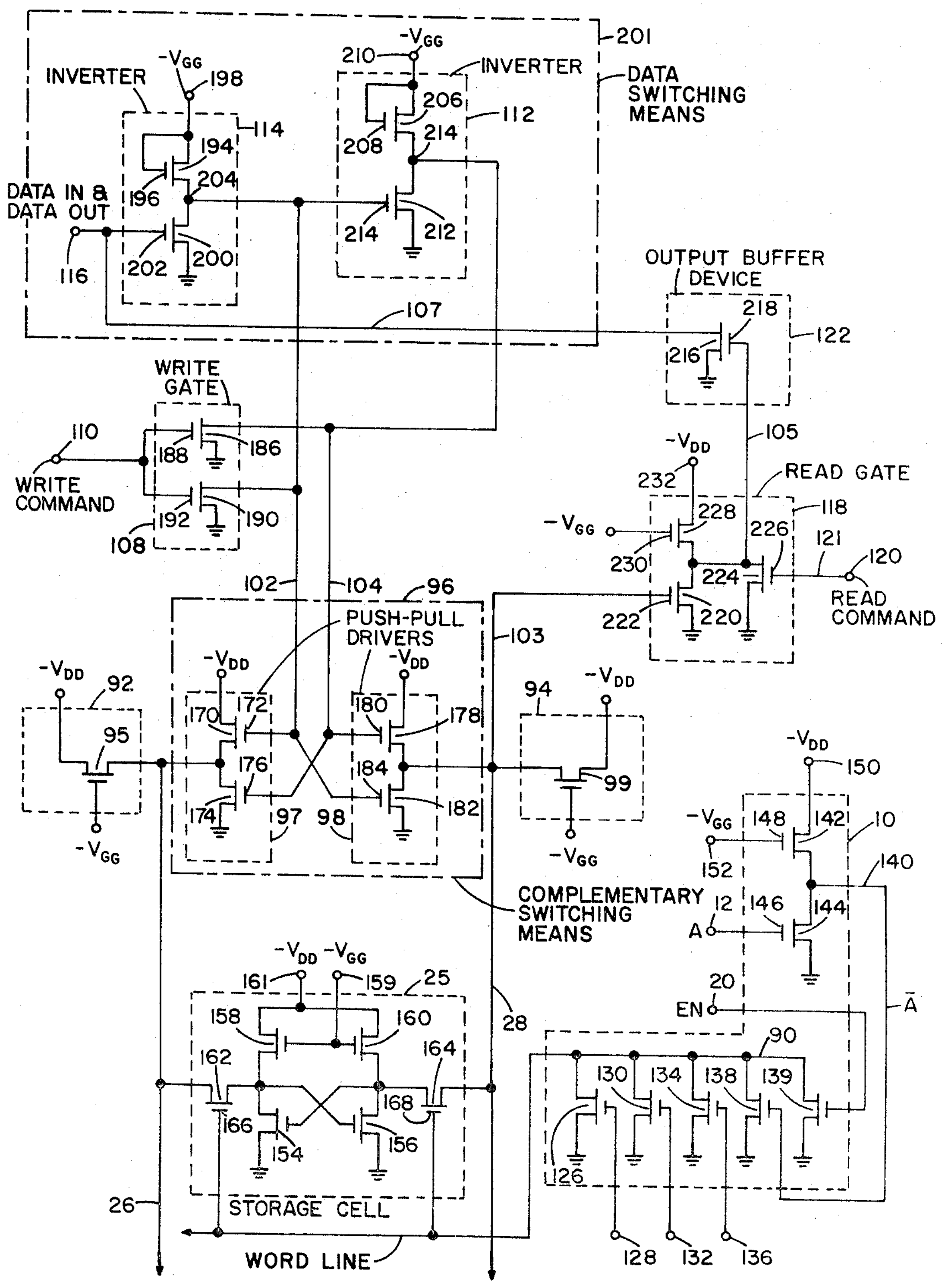
FIG. 4 is a schematic diagram of the read and write buffer circuitry according to the invention.

Referring now to FIGS. 3 and 4, the basic memory element connected to the read and write circuit 42 is a storage cell 25. This storage cell 25 is frequently referred to in the art as one "bit," meaning that it is capable of storing one bit of information. In operation, the cell 25 is in either one or the other of two fixed conductive states, so that the cell 25 either stores a "ONE" or a "ZERO" during the operation thereof. In the complete system shown in block diagram form in FIG. 1, there are 64 such 1-bit cells aligned in four columns of 16 bits per column. One read and write buffer circuit of the type to be described is fed by a single column of 16 of these memory cells and each of these cells represents one bit of a four-bit word. These 16 cells (not shown) are connected to a common bit line pair, e.g., lines 26 and 28 in FIG. 1, which feeds the read and write circuitry as shown in more detail in FIGS. 3 and 4.

Referring now to both FIGS. 3 and 4 simultaneously, bit lines 26 and 28 are connected to bit line terminating devices 92 and 94 respectively. As seen in FIG. 4, the active devices of the circuit are insulated-gate field-effect transistors (IGFETS) 95 and 99 which are also referred to in the art as metal-oxide-semiconductor devices or MOS devices. In the present specification these unipolar transistors will be referred to as MOS devices. Each MOS device has source, gate and drain regions as is well known in the art, and the application of a gate turn-on potential to one of these MOS devices controls the conductivity in the MOS device channel between source and drain regions. The devices shown in FIG. 4 are P-channel devices whose majority carriers or holes flow from ground to the negative supply $-V_{DD}$. The application of a negative potential of a predetermined magnitude to the gate electrodes of these MOS devices will produce conduction in the MOS device channels.

A pair of "totem pole" or push-pull MOS drivers 97 and 98 (FIG. 4) are connected via lines 102 and 104 to inverters 108, 114 and 112, as shown. The input data on the data line 116 is connected to the input of inverter 114 and the inverted and reinverted input data is connected from the outputs 204 and 214 of inverters 114 and 112, respectively, to the lines 102 and 104 leading into the push-pull drivers 97 and 98. The push-pull drivers 97 and 98 are referred to herein and in the alternative as complementary switching means 96. Likewise, the inverters 114 and 112, which are connected to the data-in and data-out terminal 116, are referred to herein and in the alternative as data switching means 201.

A write-command signal on line 110 is applied to the input of the write inverter stage 108, and the two outputs of the write inverter stage 108 are also connected to the lines 102 and 104 leading into the complementary switching circuitry 96. The stage 108 is referred to herein and in the alternative as a write gate 108. In order to write binary data into the storage cell 25, this data must be present in line 116 and a write-command signal must be present at the input of the write inverter stage 108.

A read gate 118 is connected via line 103 to one-bit line 28 of the bit line pair, and the output of the read gate 118 is connected via line 105 to an output buffer device 122. The output of the buffer device 122 is connected via line 107 to the data line 116, and upon application of a read command signal to terminal 120, the storage cell 25 may be read or interrogated.

Referring in detail to FIG. 4, the address, inversion and decoding circuitry 10 includes five parallel connnected MOS devices 126, 130, 134, 138 and 139 which are all connected between the word line 90 and a reference or ground potential. The data inputs 128, 132, 136, 140 and the enable input 20 must swing to approximately ground potential before the word line 90 will swing to a negative voltage −V that enables conduction in the storage cell 25. When it is desired to write binary data into the storage cell 25 or interrogate (or select) the cell 25, this is made possible by the use of the two MOS inverters comprising MOS devices 142 and 144 serially connected between a voltage supply $-V_{DD}$ at terminal 150 and ground potential. A gate bias voltage $-V_{GG}$ is connected to the gate electrode 148 of the upper MOS device 142 which serves as a load on the lower MOS device 144. When bit selection data A is applied to the gate 146, the MOS device 144 is turned on and select line 140 will swing to the "on" voltage $V_{ON}$ of the MOS device 144 which is near ground potential.

Other inverters (not shown) similar to the inverter formed by MOS devices 142 and 144 are individually connected as address inverters to the gates of MOS devices 126, 130, 134 and 138, and bit selection data must be applied to these inverters to apply a $V_{ON}$ voltage to each of the MOS devices 126, 130, 134 and 138 to turn off the latter before the word line 90 will swing negative and enable the storage cell 25 to either receive data or be interrogated.

The storage cell 25 is designed with the four MOS devices 154, 156, 158 and 160, which are cross-coupled as shown for bistable switching operation. A drain supply voltage $-V_{DD}$ is applied at terminal 161 and a gate bias voltage $-V_{GG}$ is applied at terminal 159 to operatively bias the MOS devices 158 and 160 so that MOS devices 158 and 160 function as loads on MOS devices 154 and 156, respectively. The series connected output devices 162 and 164 interconnect the basic MOS storage cell 25 to the bit lines 26 and 28, and the word line 90 is connected to the gates 166 and 168 of the series output MOS devices 162 and 164. When all of the MOS devices 126, 130, 134, 138 and 139 in logic stage 10 are turned off, the word line 90 swings negative and one of the MOS devices 162 or 164 is biased conductive, depending upon the binary state of the storage cell 25.

The complementary switching circuitry 96 of the read and write circuit 42 comprises two cross connected "totem pole" or push-pull drivers 97 and 98, and these drivers are connected between a source of drain voltage $-V_{JD}$ and ground potential. One push-pull driver 97 includes MOS devices 170 and 174 and the other driver includes 178 and 182.

Bit line terminating devices 95 and 99 may either be resistors or MOS load devices, and these terminating devices interconnect the push-pull drivers 97 and 98 to a fixed bias potential $-V_{DD}$. The outputs of the push-pull drivers 97 and 98 are directly connected to the bit lines 26 and 28, respectively.

A data-in and data-out line 116 is connected to the gate 202 of the MOS device 200 in a first inverter 114, and the drain voltage of MOS device 200 appearing at terminal 204 is directly connected to the gate 213 of MOS device 212 in a second inverter 112. MOS devices 200 and 212 in each of the first and second inverters are connected through MOS load devices 194 and 206, respectively, to voltage $-V_{GG}$ at terminals 198 and 210. The gates 196 and 208 of MOS devices 194 and 206 are connected to the drains thereof, and MOS devices 194 and 206 function as current limiters to load the MOS devices 202 and 212, respectively. Thus, the input data applied to the gate 202 of MOS device 200 is inverted and applied via line 102 to the push-pull driver 98. The output signal at terminal 204 is reinverted by MOS device 212 and applied via line 104 to the push-pull driver 97.

THe output buffer device 122 consists of MOS device 216 with the gate 218 thereof connected to the output line 105 of the read gate 118. The drain of the MOS device 216 is connected via line 107 to the data line 116.

The write inverter stage 108 includes a pair of MOS devices 186 and 190 having their gates 188 and 192 connected to a common write input terminal 110. The outputs or drains of MOS devices 186 and 190 are connected via lines 104 and 102 to the push-pull drivers 97 and 98, respectively. The write inverter stage 108 will be described in more detail in the following description of read-write circuit operation.

The read gate 118 includes a pair of parallel connected MOS devices 220 and 224 which are connected between a read gate output line 105 and reference or ground potential. The gate 222 of MOS device 220 is connected to the bit line 28 and is responsive to the potential thereon to control the output voltage on line 105. A MOS load device 228 is connected between the drain of MOS device 220 and a supply voltage $-V_{DD}$ at terminal 232. The gate 226 of the MOS device 224 is connected to a read input terminal 120, and a read-command signal 72 or 74 (FIG. 2) is applied to terminal 120 if it is desired to read (interrogate) the storage cell 25.

WRITING

Assume first that it is desired to write a binary "ONE" into the storage cell 25 and that by definition the storage cell 25 stores a binary "ONE" when MOS device 156 is conducting and when MOS device 154 is nonconducting. COnversely, a binary "ZERO" is stored in cell 25 if MOS device 156 is nonconducting and MOS device 154 is conducting. Assume also that MOS devices 126, 130, 134, 138 and 139 are all biased nonconducting and that the word line 90 is at some negative potential. If word line 90 is at a negative voltage $-V_{DD}$, both MOS devices 162 and 164 will conduct. THerefore, the ENABLE voltage 76 (FIG. 2) should never trail the data, write command or read command signals. Otherwise the bit lines 26 and 28 would be improperly connected to the storage cell 25 during the tine the storage cell should be disabled or inhibited.

In order to write a "ONE" into the storage cell 25, regardless of its previous binary conductive state, bit line 28 must be driven low toward ground potential and bit line 26 must be driven to some negative voltage by a differential signal at the outputs of the push-pull drivers 97 and 98. In order to write a "ONE" into storage cell 25, a write "ONE" data signal 60, a write-command signal 66 and an enable signal 78 (FIG. 2) must be simultaneously applied to the address, inversion and decoding circuits 10. For purposes of explanation, the write "ONE" data signal 60 and its affect on the read-write circuit 42 will first be considered. Thereafter, the function of the write-command signal 66 will be considered. It is assumed that the enable signal 78 is present and that word line 90 is at some negative potential.

When the write "ONE" data signal 60 is applied to the gate 202 of MOS device 200, MOS device 200 turns off and output terminal 204 is driven to a negative potential, turning on MOS device 212. Thus, complementary negative and positive going signals, respectively, appear at output terminals 204 and 214 of the two inverters 114 and 112, respectively. The negative going signal at output terminal 204 is applied via line 102 to the gates 172 and 184 of the MOS devices 170 and 182, respectively. This negative going signal biases the two MOS devices 170 and 182 to conduction, driving bit line 28 near ground potential and driving but line 26 toward the $-V_{DD}$ drain voltage of the MOS device 170. THus, the bit line conditions described above for writing a binary "ONE" into the storage cell 25 are present.

WIth the MOS device 212 conducting, the $V_{ON}$ voltage of MOS device 212 biases the MOS devices 178 and 174 in the push-pull drivers 98 and 97 to nonconduction, so that MOS devices 178 and 174 conduct alternately with MOS devices 182 and 170, respectively.

Since a write-command positive going signal 66 is presently being applied to the gates 188 and 192 of the two write inverters 186 and 190, these two inverters are turned off and do not affect the potentials on lines 104 and 102. However, at all other times when the write-command input applied to the gates 188 and 190 is at a negative voltage $-V$, both of the inverters 186 and 190 are turned on. For this condition, gates 172, 176, 180 and 184 of all of the MOS devices 170, 174, 178 and 182 are biased near ground potential and all of these MOS devices in the complementary switching circuitry 96 are turned off. Therefore, with no write-command signal applied to terminal 110, both MOS inverters 188 and 192 conduct and inhibit the complementary switching circuitry 96 from affecting the bit lines 26 and 28.

If it is desired to write a "ZERO" into the storage cell 25, then the positive going write-command signal 68 is applied to the write-command terminal 110 while the data line 116 remains at some fixed negative voltage. For this condition, the MOS device 200 is conducting and the MOS device 212 is nonconducting. The potentials at the output terminals 204 and 214 of the inverters 114 and 112 will, therefore, drive MOS device 174 to conduction and drive MOS device 182 to nonconduction, thereby reversing the previously described condition of potentials on the bit lines 26 and 28. That is, bit line 28 will now be driven towards the drain voltage $-V_{DD}$ by the MOS device 178. These potentials on bit lines 26 and 28 will initiate a change in the conductive state of the storage cell 25 and turn off MOS device 156 and turn on MOS device 154 if a binary "ONE" was previously stored in the cell 25. MOS device 154 is turned on by the negative going potential coupled through MOS device 164 to the gate of MOS device 154.

READING

When it is desired to read the binary conductive state of the storage cell 25, it is necessary to simultaneously apply the read-command signal 72 and enable signal 80 (FIG. 2) to the circuit in FIG. 4. Assume that a binary "ONE" is stored in the storage cell 25 and that it is desired to provide an indication of same by a data output signal on line 116.

With a binary "ONE" stored in the storage cell 25, bit line 28 is near ground potential and MOS device 220 in the read gate 118 is biased nonconducting. Prior to the application of the read-command signal 72 to the gate 226 of MOS device 224, the latter device was biased with a negative gate voltage and MOS device 224 was conducting; the gate 218 of the output buffer MOS device 216 was near ground potential and the MOS device 216 was nonconducting. However, when a read-command signal 72 is applied to the gate 226 of the MOS device 224, MOS device 224 is turned off and the gate voltage at the gate 218 of MOS device 216 is driven negative toward the $V_{DD}$ supply voltage for MOS load device 228. At this time, MOS buffer device 216 turns on and drives the data line 116 toward ground potential, producing a read-"ONE" pulse 62 as shown in FIG. 2.

If the storage cell 25 is in a binary "ZERO" state so that bit line 26 is near ground potential and bit line 28 is at approximately $-V$, then the MOS device 220 will be biased conductive during the application of the read "ZERO" command pulse 74 to MOS device 224. For this condition, MOS buffer device 216 remains turned off and the voltage level of $-V$ on the data line 116 remains unchanged.

Various modifications may be made to the above-described embodiment of the present invention without departing from the scope thereof. For example, some of the MOS load devices, such as devices 194 and 206, having gate and drain electrodes connected together may be replaced with resistors within the scope of this invention.

I claim:

1. In a read-write memory system of the type employing a plurality of storage cells, a read-write system for reading the binary content of the storage cell and for writing into the storage cell, said system including in combination:

a. complementary switching means having first and second input connections for receiving binary signals and having first and second output connections which provide complementary binary output signals in response to binary input signals applied to said first and second input connections, b. write switching means connected to a write input terminal for receiving thereat a write command signal, said write switching means having first and second output connections which are connected respectively to said first and second input connections of said complementary switching means for establishing thereat a predetermined binary input signal condition in response to a write command signal applied to said write switching means, and c. data switching means connected to a data line for receiving data signals to be stored, said data switching means having first and second output connections which provide data and inverted data signals in response to input data signals applied to said data switching means, said first and second output connections of said data switching means connected respectively to said first and second input connections of said complementary switching means, whereby said data and inverted data signals switch said complementary switching means to one of its two conductive states and thereby provide output signals at the first and second output connections of said complementary switching means, said output signals from saiu complementary switching means applied to said storage cell to write data into said storage cells in response to data and write command signals applied to said read-write system.

2. The system defined in claim 1 which further includes:

a. read gate means having first and second input connections which are connected respectively to said storage cell and to a read command terminal, said read gate means responsive to a read command signal and to the binary signal condition of said storage cell to provide a read output signal, and b. means coupling said read output signal to said data line.

3. The system defined in claim 2 wherein said coupling means includes a buffer device having a high input impedance, said buffer device further having an input electrode connected to the output of said read gate means and an output electrode connected to said data line.

4. THe system defined in claim 1 wherein said data switching means include:

a. a first inverter connected to said data line for inverting the data signals thereon, said first inverter having the output thereof connected to said first input connection of said complementary switching means for applying inverted data signals thereto, and b. a second inverter connected to the output of said first inverter for reinverting said data signals, said second inverter having the output thereof connected to second input connection to said complementary switching means, whereby said first inverter applies an inverted data signal to said first input connection of said complementary switching means and said second inverter applies noninverted data signals to said second input connection of said complementary switching means, said inverted and noninverted data signals driving said complementary switching means to a fixed one of its two conductive states to thereby apply a differential signal to said storage cell.

5. The system defined in claim 1 where said write switching means includes:

a. a first write inverter connected between a write command input terminal and said first input connection to said complementary switching means, and b. a second write inverter connected between said write command input terminal and said second input connection to said complementary switching means, said first and second write inverters simultaneously applying inverted write command signals to said first and second input connections to said complementary switching means and enable said complementary switching means during the presence of a write command signal applied to said write command input terminal.

6. The system defined in claim 1 wherein said complementar, switching means includes:

a. a first pair of metal-oxide-semiconductor MOS devices connected in series between a voltage supply terminal and a point of reference potential and having a first output terminal therebetween, and b. a second pair of metal-oxide-semiconductor MOS devices serially connected between a voltage supply terminal and a point of reference potential and having said second output terminal therebetween, said MOS devices in each pair alternately biased into conduction by signals applied to said first and second input connections to said complementary switching means, said pairs of MOS devices cross-coupled to provide bistable switching action upon receipt of binary signals at said first and second input connections to said complementary switching means.

7. The system defined in claim 6 wherein said write switching means includes:

a. a first metal-oxide-semiconductor MOS inverter connected between said write command input terminal and said first input connection to said complementary switching means, and b. a second metal-oxide-semiconductor MOS inverter connected between said write command terminal and said second input connection to said complementary switching means, said write command input terminal connected to receive a DC bias at a predetermined level in the absence of write command signals to bias said first and second MOS inverters into conduction and inhibit switching in both pairs of MOS devices in said complementary switching means.

8. The system defined in claim 7 wherein said data switching means include:

a. a first MOS inverter connected to said data line for inverting data signals applied thereto, said first MOS inverter having an output terminal connected to said first input connection to said complementary switching means, and b. a second MOS inverter connected to said output terminal of said first inverter for reinverting signals at said output terminal of said first inverter, said second MOS inverter having an output terminal connected to said second input connection to said complementary switching means, whereby said first and second MOS inverters of said data switching means apply, respectively, inverted and noninverted data to said first and second input connections to said complementary switching means, said inverted and noninverted data being effective to switch said complementary switching means to a fixed one of its two bistable conductive states upon receipt of write command signals at said write switching means.

9. The system defined in claim 8 which further includes read gate means having first and second input terminals connected to receive, respectively, a read-command signal and binary data from said storage cell, said read gate means responsive to said read-command signal and to the binary signal condition of said storage cell to thereby provide a read output signal which is operatively coupled to said data line.

10. The system defined in claim 9 wherein:

a. said read gate means includes a first metal-oxide-semiconductor MOS device connected to receive said read-command signal and further connected in parallel with a second metal-oxide-semiconductor MOS device, said second MOS device being connected to said storage cell, and b. a metal-oxide-semiconductor MOS buffer device connected between said first and second MOS devices in said read gate means and said data line, said MOS buffer device biased to conduction to drive said data line to the on voltage $V_{ON}$ of said MOS buffer device only when a read-command signal is applied to said first MOS device in said read gate means and a predetermined potential is applied to said second MOS device in said read gate means in accordance with a predetermined binary signal condition of said storage cell.